Patented Jan. 7, 1936

2,027,150

UNITED STATES PATENT OFFICE 2,027,150

DERIVATIVES OF UREA

Samuel Coffey and John Edgar Schofield, Huddersfield, England, assignors to Imperial Chemical Industries Limited, a corporation of Great Britain No Drawing. Application October 24, 1933, Serial No. 694,997. In Great Britain October 28, 1932

4 Claims. (Cl. 260—124)

This invention relates to new derivatives of urea and more particularly refers to aryl-carbamido-naphthol-sulfonic acids which are especially useful as dye intermediates.

It is an object of this invention to produce new derivatives of urea, which are useful as intermediates for dyestuffs. Additional objects will become apparent from a consideration of the following description.

These objects are attained according to the process of the present invention wherein a nitrophenyl-carbamyl-chloride is reacted with an amino-naphthol-sulfonic acid of the group consisting of J-acid and γ-acid, to produce an unsymmetrical diaryl urea whose free acid form has the general formula

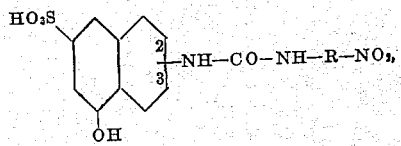

wherein R is an arylene radical of the benzene series, and wherein the urea group is attached in position 2 or 3. The novel compounds are useful as intermediates for dyestuffs. By reduction of the nitro group other intermediates may be prepared.

The invention may be more readily understood by a consideration of the following illustrative examples, in which the quantities are stated in parts by weight:

Example 1

120 parts of 2,5-amidonaphthol-7-sulphonic acid (J acid) are dissolved in a solution of 70 parts of soda ash in 1000 parts of water and 100 parts of p-nitrophenyl carbamyl chloride (p-nitro-carbanilic acid chloride, p-NO$_2$-C$_6$H$_4$-NH-COCl) are added to the well-stirred solution. The mixture is warmed gently during about 1 hour to 80° C. During this period a brisk effervescence, accompanied by some frothing, takes place and ceases as the temperature nears 80° C. The weakly alkaline suspension is filtered and the residue washed with a little hot water. The sodium salt of 2(p-nitrophenylcarbamido)-5-naphthol-7-sulphonic acid is purified by dissolving in dilute caustic soda solution, filtering to remove a small amount of p-nitroaniline and di-nitrodiphenylurea, and reprecipitating from the cold solution with hydrochloric acid. A good yield of 2(p-nitrophenylcarbamido)-5-naphthol-7-sulphonic acid is obtained, the compound being precipitated in the form of the sodium salt as a greenish-yellow powder.

Example 2 p-nitrophenylcarbamyl chloride is condensed with 2,8-aminonaphthol-6-sulphonic acid (γ acid) in the manner described in Example 1. The sodium salt of 2(p-nitrophenylcarbamido)-8-naphthol-6-sulphonic acid is obtained in 85% yield as a greenish-yellow powder.

Example 3

120 parts of 2,5-amidonaphthol-7-sulphonic acid are dissolved in a solution of 70 parts of soda ash in 1000 parts of water and 100 parts of m-nitrophenylcarbamyl chloride are added to the well-stirred solution. The mixture is warmed slowly to 80° C., held at that temperature till all effervescence has ceased, and is filtered at 80° C. to remove traces of m-nitroaniline and di-m-nitrophenyl-urea. The filtered solution is stirred and cooled and the 2(m-nitrophenylcarbamido)-5-naphthol-7-sulphonic acid, which separates as the sodium salt in good yield, is filtered and dried. It is a greenish-yellow powder.

Example 4

3-nitrophenylcarbamyl chloride is condensed with 2,8-aminonaphthol-6-sulphonic acid as described in Example 3. The sodium salt of 2(m-nitrophenylcarbamido)-8-naphthol-6-sulphonic acid is obtained in 75% yield as an olive-green powder.

Example 5

A solution of 108 parts of o-nitro-p-tolylcarbamyl chloride in 700 parts of cold toluene is added to a stirred solution of 120 parts of 2,8-amidonaphthol-6-sulphonic acid and 70 parts of soda ash in 1000 parts of water. The mixture is vigorously stirred and warmed to 60° C., alkalinity being preserved by the addition of more soda ash if necessary. The mixture is filtered at 60° C., and the residual 2(o-nitro-p-tolylcarbamido)-8-naphthol-6-sulphonate of sodium is washed with a little hot water and dried. The product is a dull orange powder.

Example 6

A solution of 118 parts of p-chloro-o-nitrophenylcarbamyl chloride in 700 parts of cold toluene is added to a stirred solution of 120 parts of 2,5-amidonaphthol-7-sulphonic acid and 70 parts of soda ash in 1000 parts of water. The mixture is vigorously agitated and warmed to 60° C. alkalinity being preserved by the addition of further soda ash if necessary. The product is filtered at 60° C., washed with a little hot water, and dried to give a 95% yield of sodium 2(p-c h l o r o-o-nitrophenylcarbamido)-5-naphthol-7-sulphonate in the form of a brown powder.

As many apparently widely different embodiments of this invention may be made without departing from the spirit and scope thereof, it is to be understood that the invention is not limited to the specific embodiments thereof except as defined in the appended claims.

We claim:

1. Derivatives of urea having in the form of free acid the following general formula:

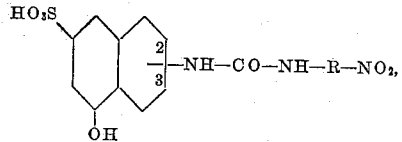

wherein R is an arylene radical of the benzene series, and the urea group is attached in position 2 or 3.

2. An intermediate for dyestuffs having in the form of its sodium salt the general formula

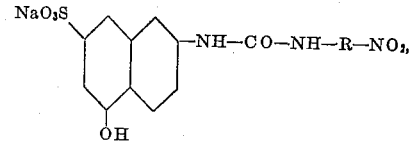

wherein R is an arylene radical of the benzene series.

3. An intermediate for dyestuffs having in the form of its sodium salt the general formula

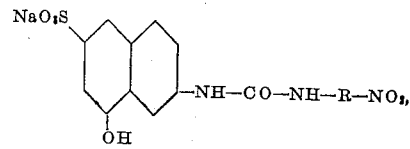

wherein R is an arylene radical of the benzene series.

4. The process of producing an intermediate for dyestuffs, which comprises reacting with a nitrophenyl-carbamyl-chloride upon an aminonaphthol sulfonic acid of the group consisting of J and γ acids, in alkaline aqueous solution, and recovering the unsymmetrical urea thus formed.

SAMUEL COFFEY.
JOHN EDGAR SCHOFIELD.